United States Patent
Hsieh

(10) Patent No.: US 7,392,712 B2
(45) Date of Patent: Jul. 1, 2008

(54) ELECTRONIC TORSIONAL TOOL

(76) Inventor: Chih-Ching Hsieh, 235 Chung-Ho Box 8-24, Taipei (TW)

(*) Notice: Subject to any disclaimer, the term of this patent is extended or adjusted under 35 U.S.C. 154(b) by 110 days.

(21) Appl. No.: 11/438,143

(22) Filed: May 22, 2006

(65) Prior Publication Data

US 2006/0201261 A1 Sep. 14, 2006

Related U.S. Application Data

(63) Continuation-in-part of application No. 10/608,578, filed on Jun. 25, 2003, now abandoned.

(51) Int. Cl.
*G01L 5/24* (2006.01)
(52) U.S. Cl. ............... 73/862.21; 73/862.23; 73/862.26
(58) Field of Classification Search .............. 73/862.21, 73/862.23, 862.26
See application file for complete search history.

(56) References Cited

U.S. PATENT DOCUMENTS

| | | | | | |
|---|---|---|---|---|---|
| 4,535,659 | A | * | 8/1985 | Yang | 81/478 |
| 4,864,841 | A | * | 9/1989 | Heyraud | 73/862.21 |
| 4,958,541 | A | * | 9/1990 | Annis et al. | 81/479 |
| 4,982,612 | A | * | 1/1991 | Rittmann | 73/862.23 |
| 6,784,799 | B2 | * | 8/2004 | Hsien | 340/668 |
| 6,940,417 | B2 | * | 9/2005 | Hsien | 340/668 |
| 2002/0178873 | A1 | * | 12/2002 | Hsieh | 81/125.1 |
| 2004/0261542 | A1 | * | 12/2004 | Hsien | 73/862.21 |

* cited by examiner

*Primary Examiner*—Edward Lefkowitz
*Assistant Examiner*—Freddie Kirkland, III

(57) ABSTRACT

An electronic torsional tool includes a main body, and a strain gauge mounted in the main body. The main body is provided with an opening to enhance flexibility of the main body and to increase deformation of the strain gauge. The opening is extended through the handle portion and the drive portion of the main body, thereby enhancing deformation of the main body, and thereby increasing deformation (or distortion) of the strain gauge, so as to detect and obtain the torsion values exactly.

6 Claims, 13 Drawing Sheets

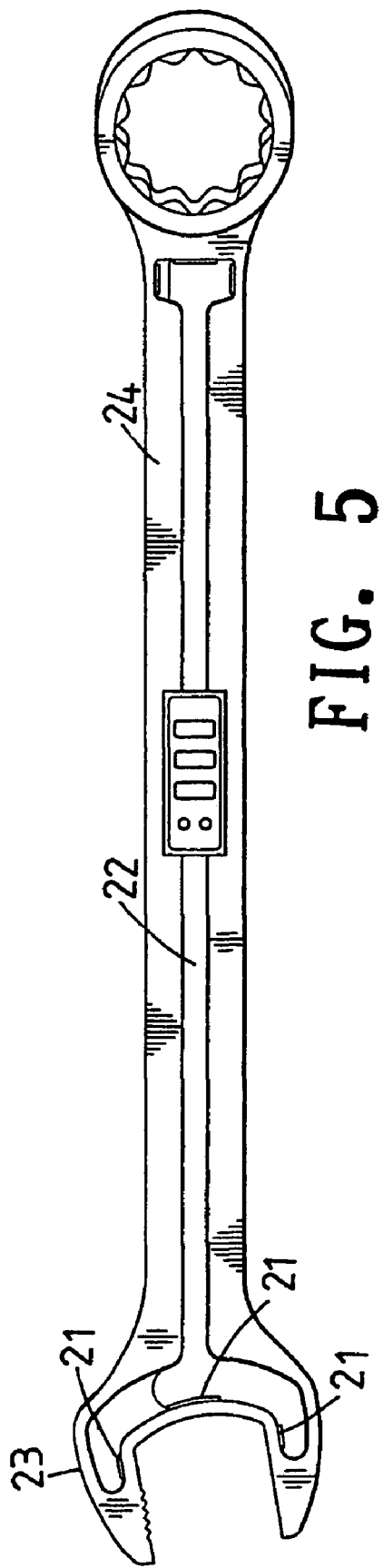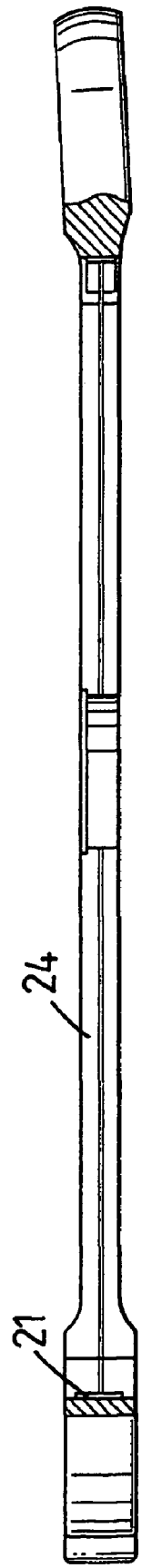

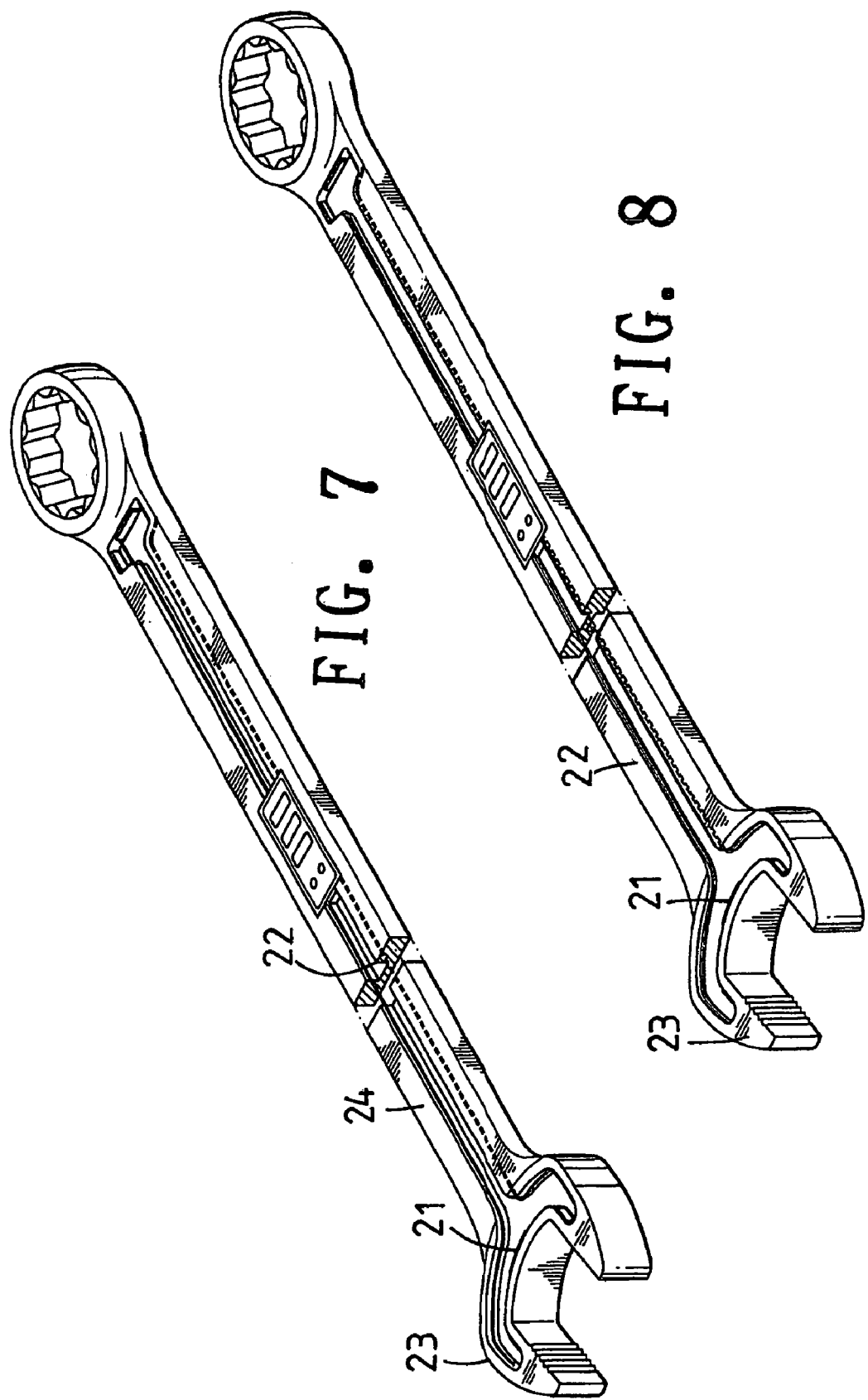

ELECTRONIC TORSIONAL TOOL

The present invention is a continuation in part of the U.S. patent application with Ser. No. 10,608,578 filed on Jun. 25, 2003, now abandoned assigned and invented by the assigner and inventor of the present invention. Thus the contents of the application, U.S. patent application Ser. No. 10,608,578 are incorporated into the present invention as a part of the specification of the present invention.

BACKGROUND OF THE INVENTION

1. Field of the Invention

The present invention relates to an electronic torsional tool, and more particularly to an electronic torsional tool provided with an opening to enhance flexibility of the electronic torsional tool.

2. Description of the Related Art

A conventional pointer type torsional wrench in accordance with the prior art shown in FIG. 10 comprises a drive shank 10 having a first end formed with a drive head 11, a handle 14 pivotally mounted on a second end of the drive shank 10 by a pivot shaft 15, a torsion scale 13 secured on the drive shank 10 and located adjacent to the handle 14, and a pointer rod 12 integrally extended from the drive head 11 and having a free end pointed to the torsion scale 13. The pointer rod 12 is in parallel with the drive shank 10 at the normal state.

In operation, the drive head 11 is fitted on a workpiece (by a socket for example). The operator exerts a force on the handle 14 to rotate the drive shank 10 of the wrench and to operate the workpiece. The handle 14 is pivoted with the drive shank 10 by the pivot shaft 15, so that the force in each direction exerted by the operator on the handle 14 can be concentrated on the pivot shaft 15 and can be transmitted to the drive shank 10 of the wrench. Thus, when the force applied on the drive shank 10 of the wrench exceeds a predetermined value, the pointer rod 12 deviates from the drive shank 10 through a relative angle, so that the pointer 120 of the pointer rod 12 can indicate the torsion value exerted on the wrench by the deflecting angle between the pointer rod 12 and the drive shank 10.

However, the conventional pointer type torsional wrench has the following disadvantages.

The operator has to exert a torsional force on the handle 14 successively so that the pointer 120 of the pointer rod 12 can read the torsion values. Thus, the indicated torsion reading values are not accurate because the successive force applied by the operator is not evenly distributed.

2. The pointer rod 12 protrudes from the drive shank 10, so that it is easily hit by a foreign object, thereby affecting the accuracy of the pointer rod 12.

3. The operator has to exert a torsional force on the handle 14 successively so that the pointer 120 of the pointer rod 12 can read the torsion values, thereby wasting the operator's energy.

A conventional spring type torsional wrench 16 in accordance with the prior art shown in FIG. 11 is disclosed. The output torsion of the torsional wrench 16 is adjustable. When the force applied on the wrench exceeds a predetermined value, the wrench idles, thereby limiting the torsion exerted by the operator to a determined value. However, the torsional wrench 16 cannot clearly indicate the torsion reading values.

A conventional single-rod type torsional wrench 30 in accordance with the prior art shown in FIG. 12 is disclosed in the Taiwanese Patent Publication No. 485872. Another conventional single-rod type torsional wrench 32 in accordance with the prior art shown in FIGS. 13 and 14 is disclosed in the Taiwanese Patent Publication No. 488991. The above-mentioned single-rod type torsional wrench is formed with a plurality of recesses for receiving the strain gauge, the bridge and the digital indicator.

A conventional double-rod type torsional wrench in accordance with the prior art shown in FIG. 15 is disclosed in the U.S. Pat. No. 4,958,541. The above-mentioned double-rod type torsional wrench comprises a solid inner rod 18 co-operating with a strain gauge, and a hollow outer rod 17 mounted on the solid inner rod 18.

SUMMARY OF THE INVENTION

The primary objective of the present invention is to provide an electronic torsional tool, wherein main body is provided with an opening to enhance flexibility of the main body.

Another objective of the present invention is to provide an electronic torsional tool, wherein the opening enhances deformation of the main body, so as to increase deformation of the strain gauge.

A further objective of the present invention is to provide an electronic torsional tool, wherein the opening of the main body is located in a torsion deformation zone consisting of the handle portion and the drive portion of the main body.

A further objective of the present invention is to provide an electronic torsional tool, wherein the opening is extended through the handle portion and the drive portion of the main body, thereby enhancing deformation of the main body, and thereby increasing deformation (or distortion) of the strain gauge, so as to detect and obtain the torsion values exactly.

A further objective of the present invention is to provide an electronic torsional tool comprising a cover directly mounted on the main body in a riveting manner to encompass the opening of the main body so as to protect the main body.

In accordance with the present invention, there is provided an electronic torsional tool, comprising: a main body; and a strain gauge mounted in the main body; wherein, the main body is provided with an opening to enhance flexibility of the main body and to increase deformation of the strain gauge.

Furthermore, the present invention provides an electronic torsional tool. The tool comprises: a main body; and a strain gauge mounted in the main body. The main body is provided with an opening to enhance flexibility of the main body and to increase deformation of the strain gauge; and the strain gauge is mounted in the opening of the main body. The main body is provided with a handle portion and a drive portion located at a distal end of the handle portion. The driving portion is an open ended screwing driver, and the opening is extended through the whole length of the handle portion, the three sides of the opening ended screwing driver and two ends of the opening are expanded to have larger areas than other portion of the opening;

and another end of the handle portion having a screw driver with a round hole and teeth being formed on an inner periphery of the round hole.

Further benefits and advantages of the present invention will become apparent after a careful reading of the detailed description with appropriate reference to the accompanying drawings.

BRIEF DESCRIPTION OF THE DRAWINGS

FIG. 4 is a front plan cross-sectional view of the electronic torsional tool as shown in FIG. 2;

FIG. 5 is a top plan view of the electronic torsional tool as shown in FIG. 2;

FIG. 7 is a perspective view of the electronic torsional tool in accordance with another embodiment of the present invention;

FIG. 8 is a perspective view of the electronic torsional tool in accordance with another embodiment of the present invention;

DETAILED DESCRIPTION OF THE INVENTION

Figure 1:
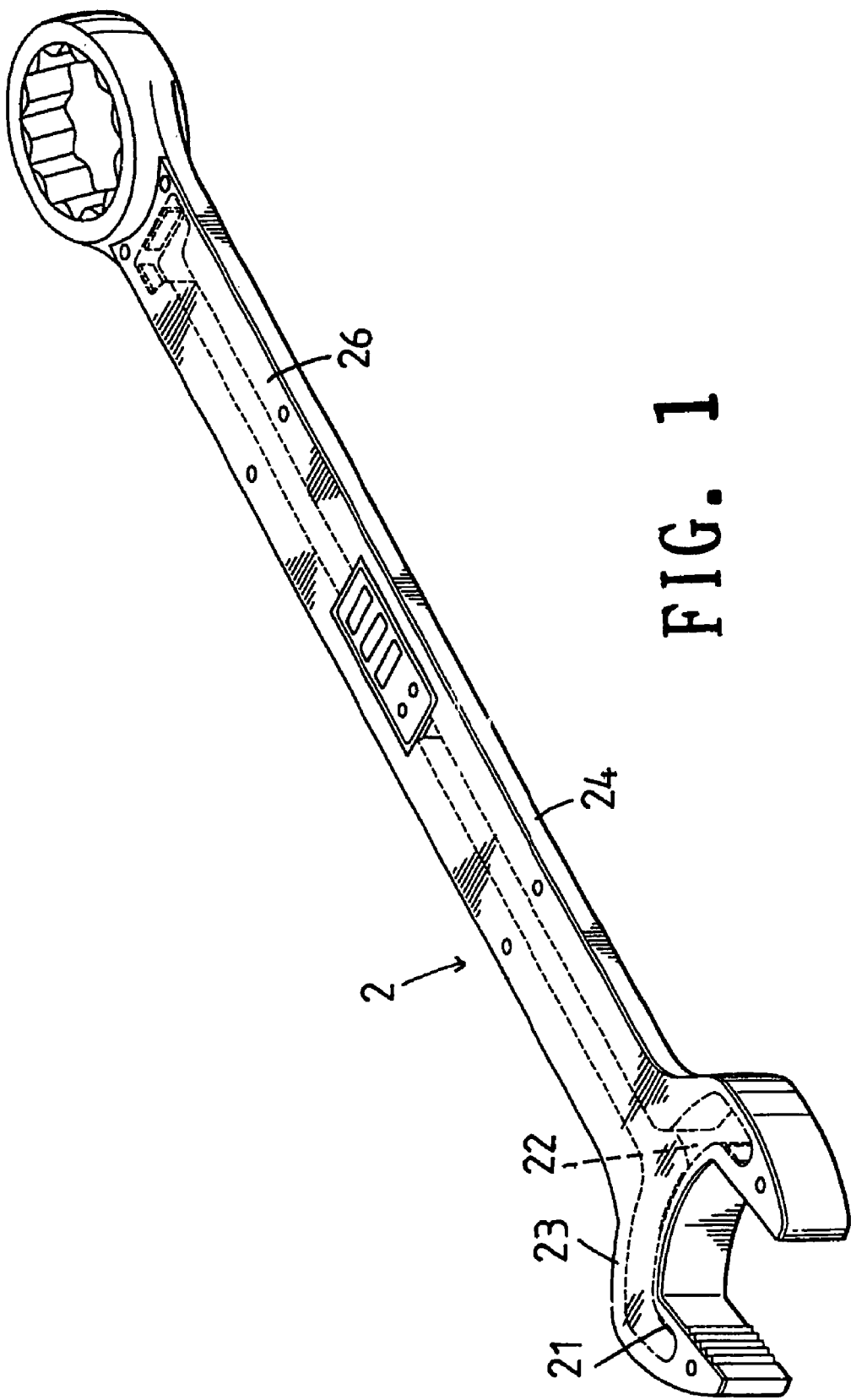
FIG. 1 is a perspective view of an electronic torsional tool in accordance with the preferred embodiment of the present invention.
Figure 2:
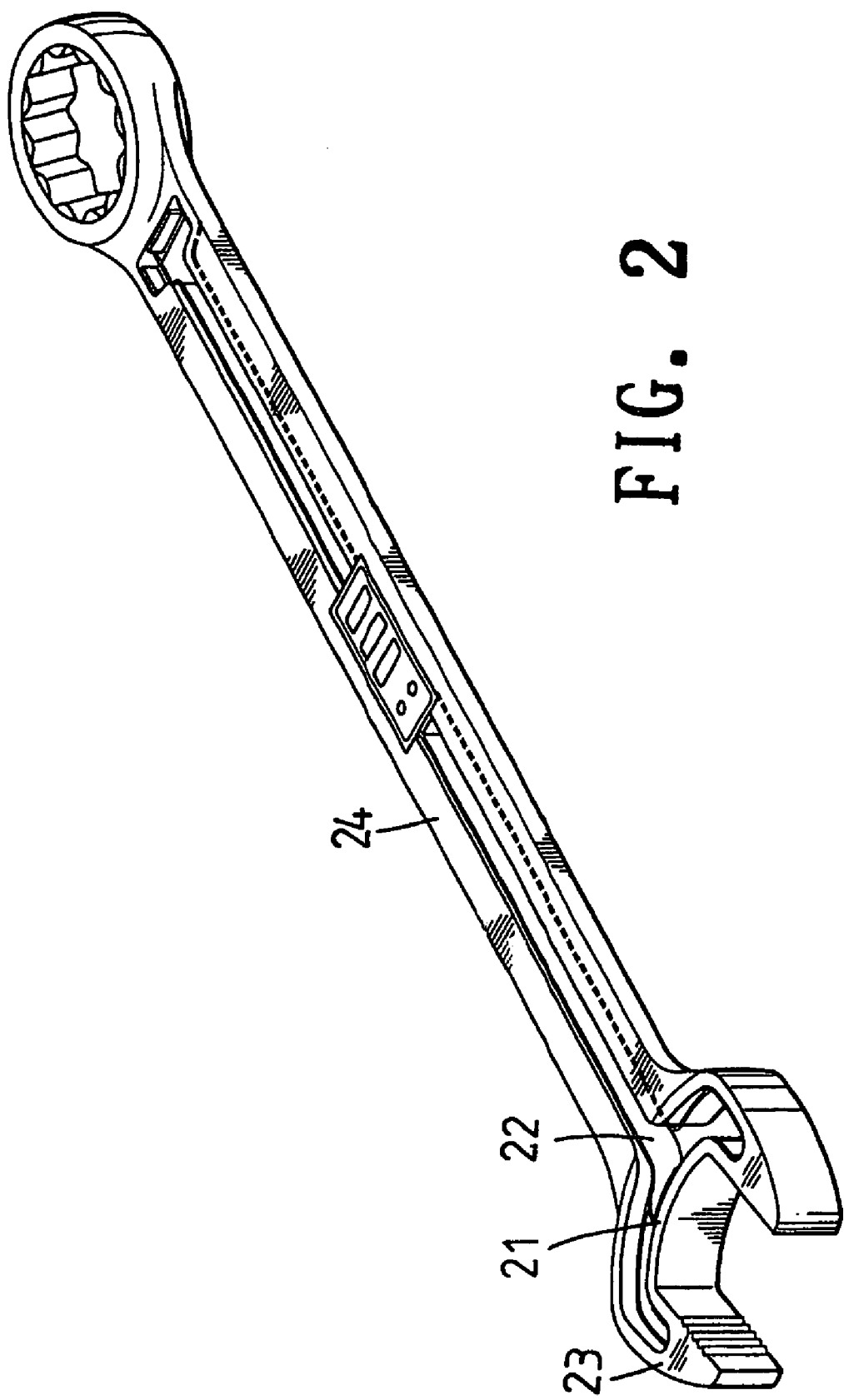
FIG. 2 is a perspective view of the electronic torsional tool in accordance with the preferred embodiment of the present invention.

Referring to the drawings and initially to FIGS. 1-5, an electronic torsional tool in accordance with the preferred embodiment of the present invention is an electronic torsional wrench and comprises a main body 2, and a strain gauge 21 mounted in the main body 2. In operation, when the electronic torsional tool is operated, the strain gauge 21 is deformed to produce a signal which is transmitted through a circuit 210 to an output unit 212 so as to provide the torsion value to the user. The structure and operation of the strain gauge 21 are conventional and will not be further described in detail.

The main body 2 is provided with a handle portion 24 and a drive portion 23 located at a distal end of the handle portion 24. The main body 2 is provided with an opening 22 to enhance flexibility of the main body 2. Preferably, the opening 22 is extended through a longitudinal length of the main body 2. Preferably, the opening 22 is extended through the handle portion 24 and the drive portion 23 of the main body 2. In addition, the strain gauge 21 is mounted in the opening 22 of the main body 2. Thus, the opening 22 enhances deformation of the main body 2, so as to increase deformation of the strain gauge 21.

The electronic torsional tool further comprises a cover 26 directly mounted on the main body 2 in a riveting manner to encompass the opening 22 of the main body 2 so as to protect the main body 2.

Figure 12:
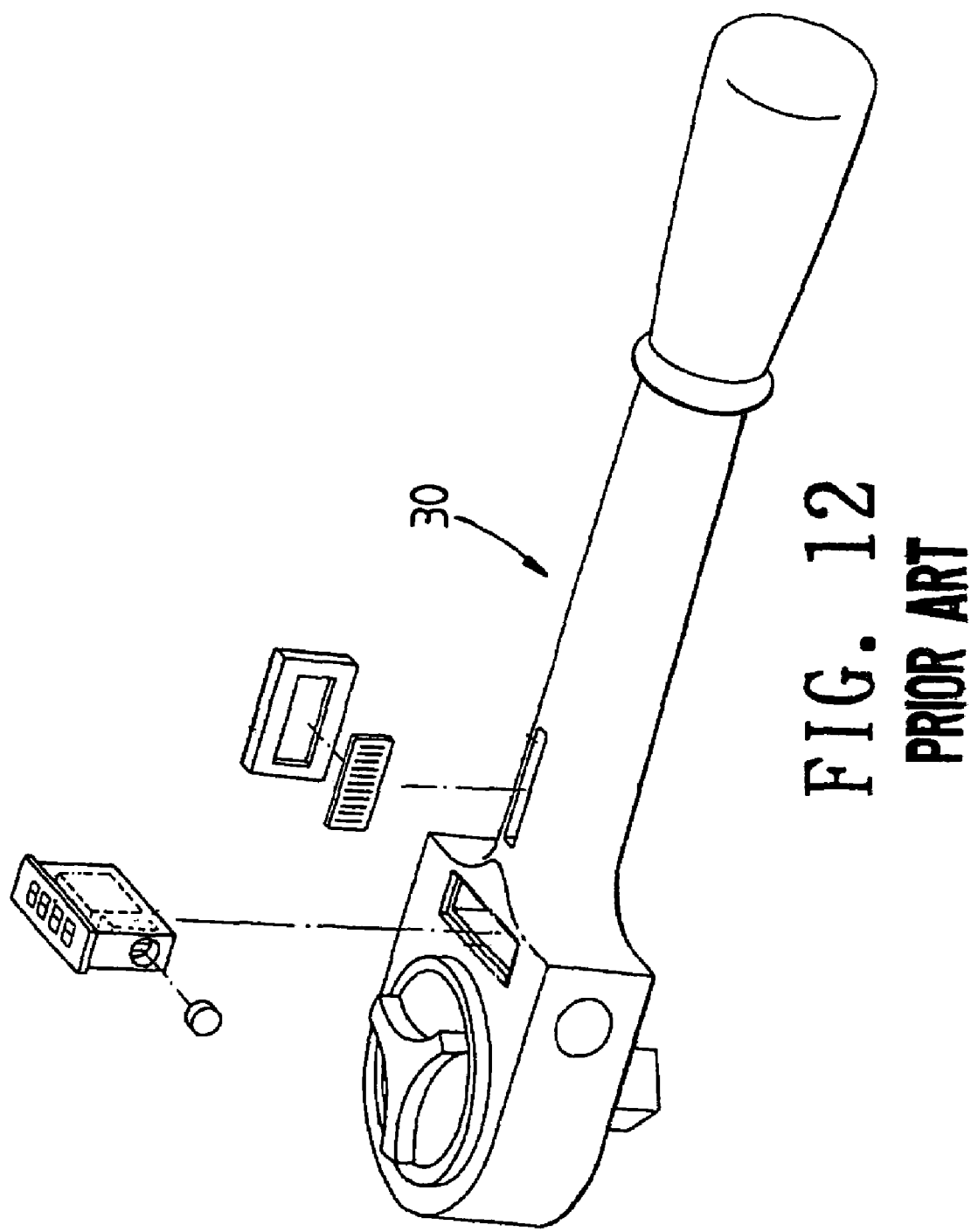
FIG. 12 is an exploded perspective view of a conventional single-rod type torsional wrench in accordance with the prior art.
Figure 13:
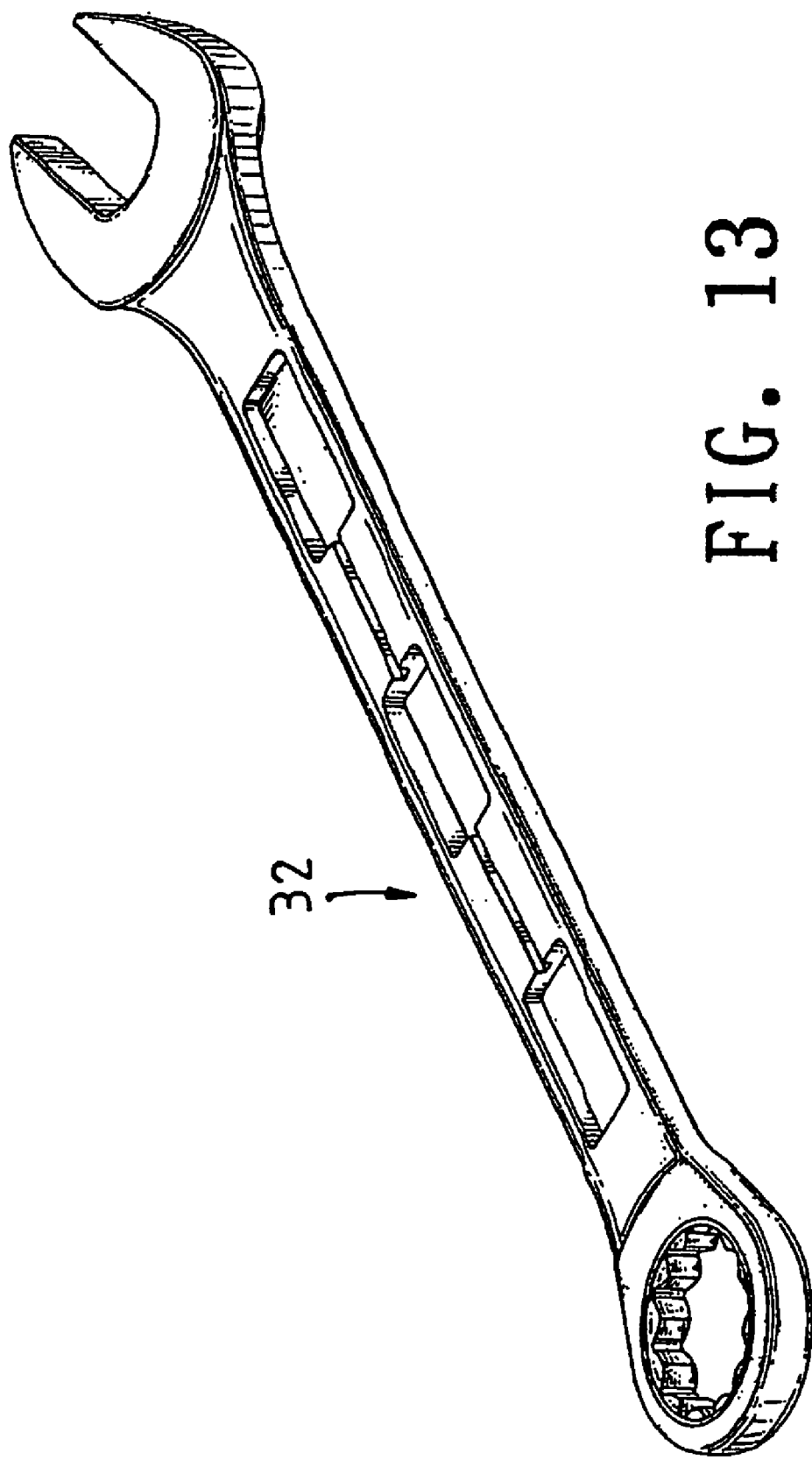
FIG. 13 is a perspective view of another conventional single-rod type torsional wrench in accordance with the prior art.
Figures 14, 14A:
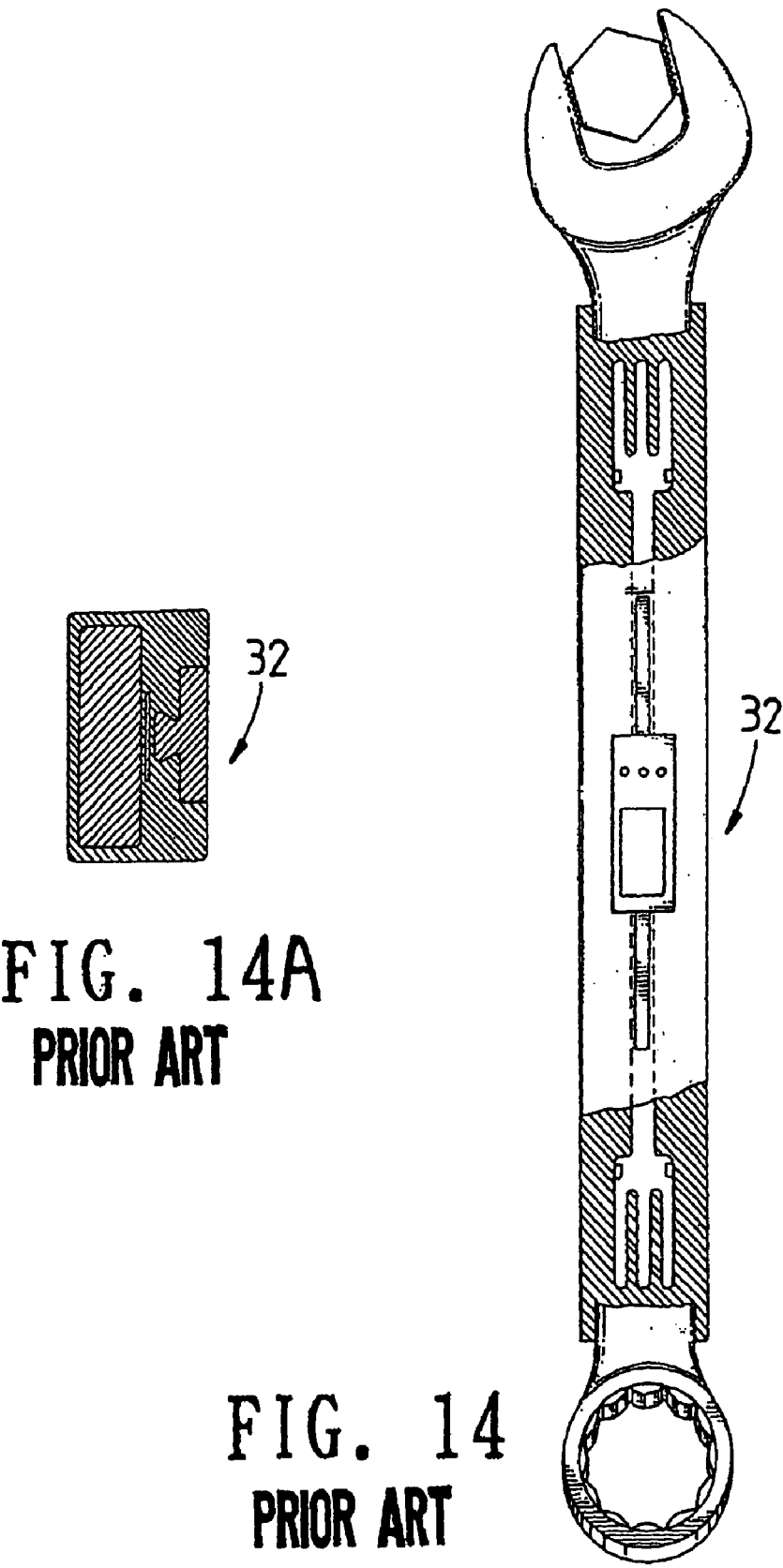
FIG. 14 is a top plan cross-sectional view of the conventional single-rod type torsional wrench as shown in FIG. 13.
FIG. 14A is a side plan cross-sectional view of the conventional single-rod type torsional wrench as shown in FIG. 14.
Figure 15:
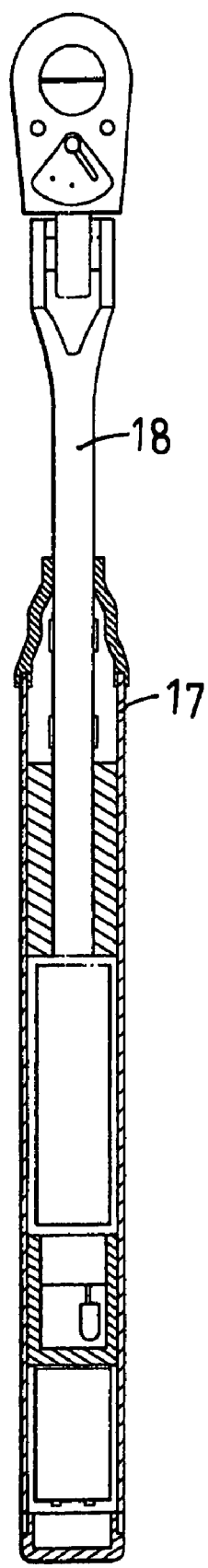
FIG. 15 is a top plan cross-sectional view of a conventional double-rod type torsional wrench in accordance with the prior art.

In comparison, in the conventional torsional wrench as shown in FIGS. 12-14, the recess is only used for receiving the strain gauge, the bridge and the digital indicator. In the electronic torsional tool in accordance with the present invention, the opening 22 enhances deformation of the main body 2, so as to increase deformation of the strain gauge 21. Thus, the function and structure of the opening 22 in the present invention are quite different from that of the recess in the conventional torsional wrench as shown in FIGS. 12-14.

Figure 3:
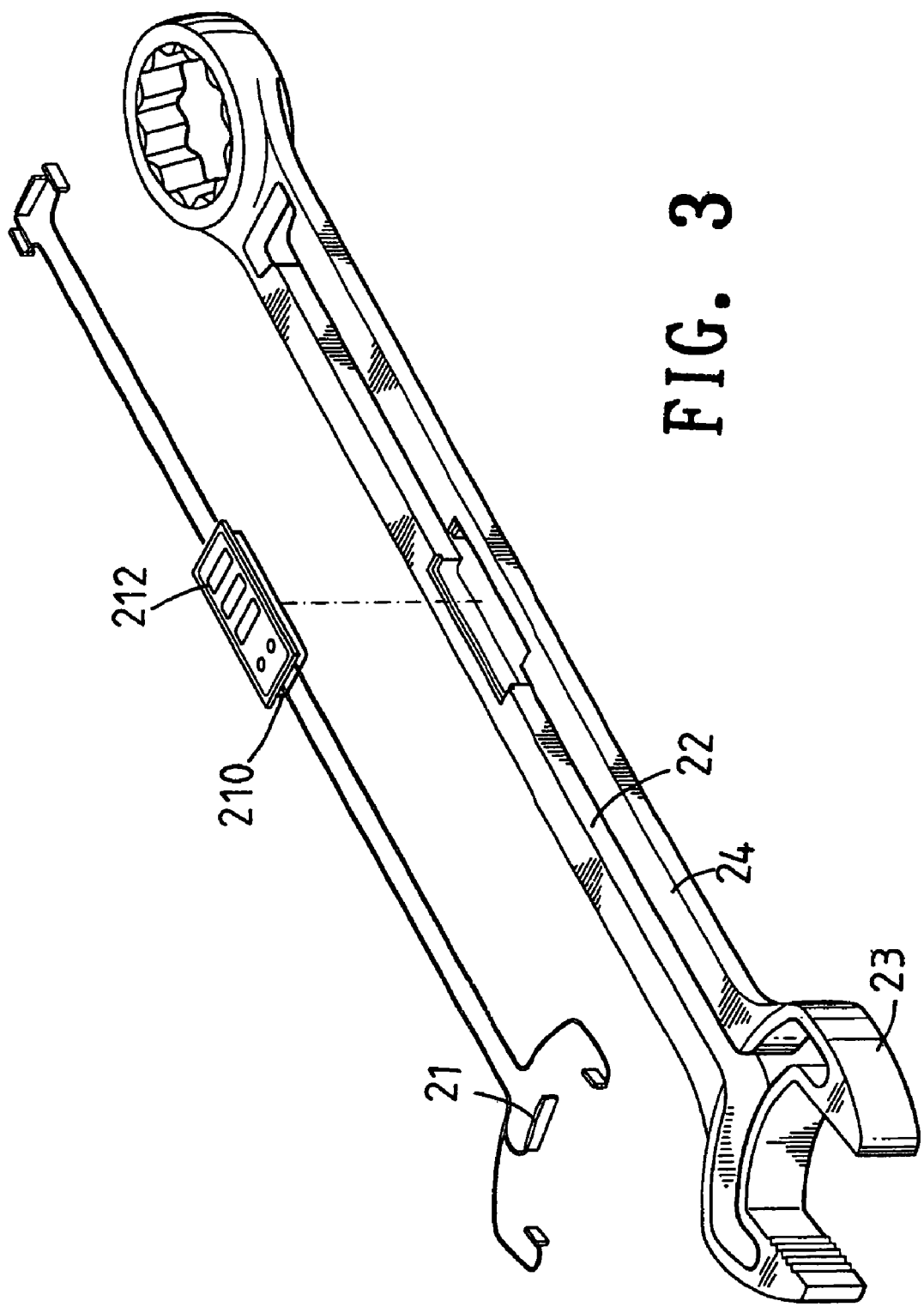
FIG. 3 is an exploded perspective view of the electronic torsional tool in accordance with the preferred embodiment of the present invention.

Furthermore, referring to FIG. 3, it is illustrated that three strain gauges are placed at three sides of the U-shaped cross section. Another end of the handle portion is a ring and teeth are formed on an inner periphery of a hole of the ring.

Figure 6:
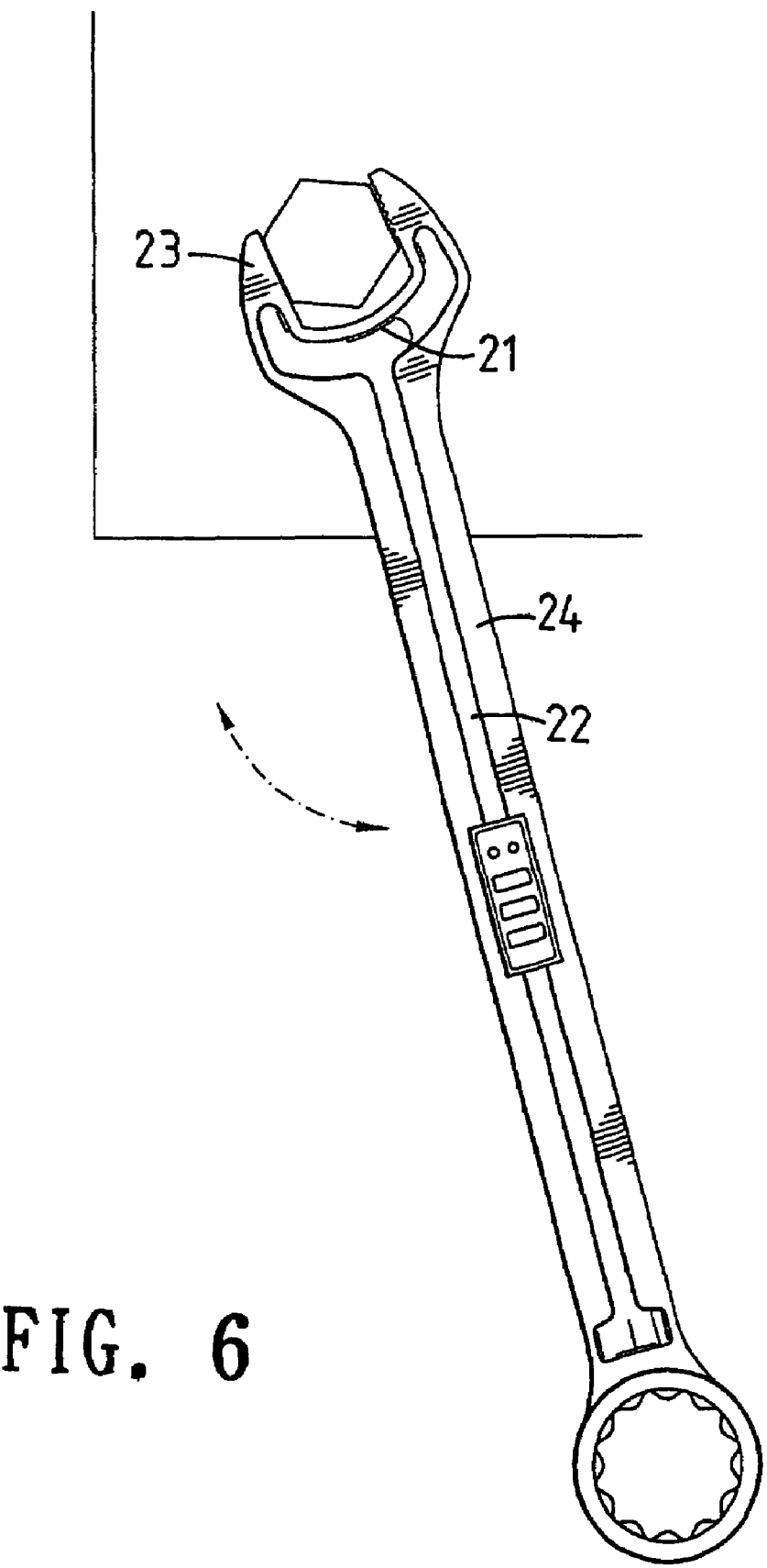
FIG. 6 is an operational view of the electronic torsional tool as shown in FIG. 5.

As shown in FIG. 6, the opening 22 is extended through the handle portion 24 and the drive portion 23 of the main body 2, thereby enhancing deformation of the main body 2, and thereby increasing deformation (or distortion) of the strain gauge 21, so as to detect and obtain the torsion values exactly.

As shown in FIG. 7, the opening 22 of the main body 2 has a substantially U-shaped cross-section and is extended through the handle portion 24 and the drive portion 23 of the main body 2 to enhance deformation of the main body 2.

As shown in FIG. 8, the opening 22 of the main body 2 has a substantially I-shaped cross-section and is extended through the handle portion 24 and the drive portion 23 of the main body 2 to enhance deformation of the main body 2.

Figure 9:
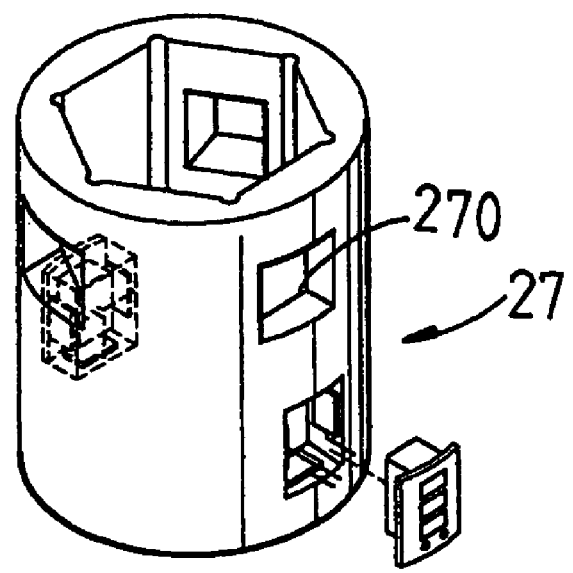
FIG. 9 is a perspective view of the electronic torsional tool in accordance with another embodiment of the present invention.
Figure 10:
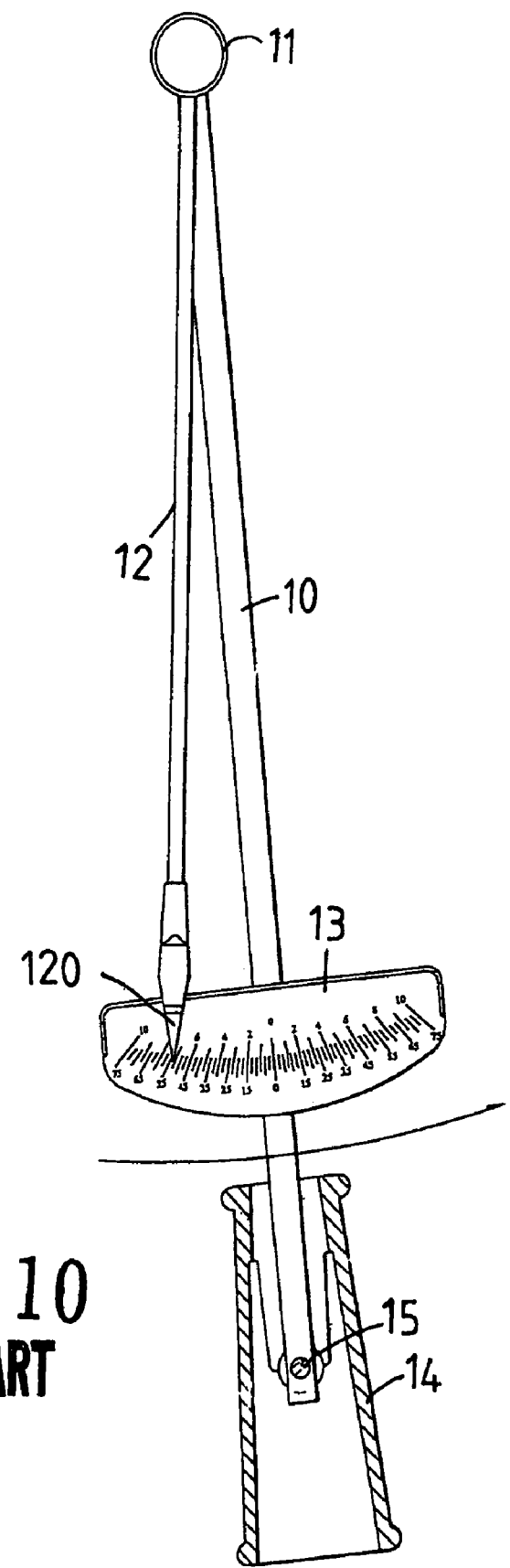
FIG. 10 is a top plan cross-sectional view of a conventional pointer type torsional wrench in accordance with the prior art.
Figure 11:
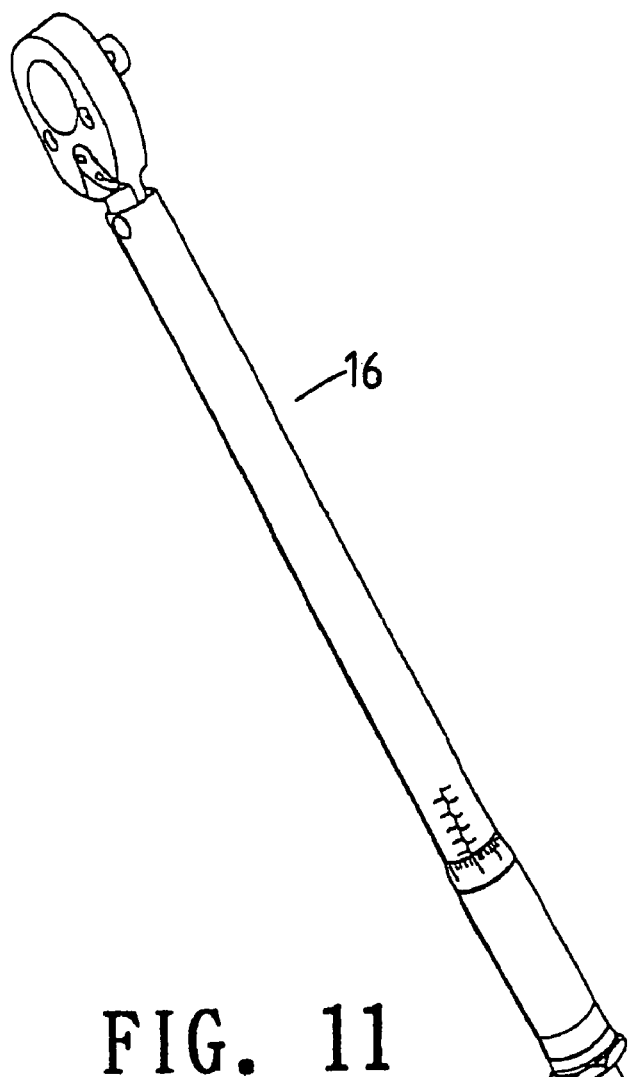
FIG. 11 is a perspective view of a conventional spring type torsional wrench in accordance with the prior art.

Referring to FIG. 9, the electronic torsional tool in accordance with another embodiment of the present invention is an electronic torsional socket and comprises a main body 27 provided with an opening 270 so as to enhance deformation of the main body 27. Furthermore, in the present invention, an strain gauge is in another opening of the torsional tool.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An electronic torsional tool comprising: a main body; and a strain gauge mounted in the main body; wherein, the main body is provided with an opening to enhance flexibility of the main body and to increase deformation of the strain gauge; and the strain gauge is mounted in the opening of the main body;

wherein the opening is extended through a whole longitudinal length of the main body; wherein the main body is provided with a handle portion and a drive portion located at a distal end of the handle portion, and the opening is extended through a whole length of the handle portion and the drive portion of the main body;

wherein one end of the opening has a U-shaped cross section; and wherein three strain gauges are placed at three sides of the U-shaped cross section; and wherein another end of the opening of the main body has a substantially I-shaped cross-section.

2. The electronic torsional tool in accordance with claim 1, wherein the electronic torsional tool is an electronic torsional wrench.

3. The electronic torsional tool in accordance with claim 1, further comprising a cover directly mounted on the main body in a riveting manner.

4. The electronic torsional tool in accordance with claim 3, wherein the cover encompasses a whole portion of the opening of the main body.

5. An electronic torsional tool comprising: a main body; and at least one strain gauge mounted in the main body; wherein, the main body is provided with an opening to enhance flexibility of the main body and to increase deformation of the strain gauge; and the strain gauge is mounted in the opening of the main body; and wherein the main body is provided with a handle portion and a drive portion located at one end of the handle portion, the driving portion is an open ended screwing driver, and the opening is extended through the handle portion and extended through three sides of the opening ended screwing driver so that one end of the opening has an approximate U shape;

wherein three strain gauges are placed at three sides of the U-shaped cross section; and wherein another end of the handle portion is a ring and teeth are formed on an inner periphery of a hole of the ring.

6. The electronic torsional tool as claimed in claim 5, wherein the opening has an expanded area near the ring so as to form a I shape area and two strain gauges are placed in the I shaped area.

\* \* \* \* \*